(12) United States Patent
Hiraga et al.

(10) Patent No.: US 7,692,675 B2
(45) Date of Patent: Apr. 6, 2010

(54) PRINT HEAD DRIVING METHOD AND IMAGE FORMATION APPARATUS USING THE SAME

(75) Inventors: Katsuya Hiraga, Chiba (JP); Yukihiko Shimizu, Chiba (JP)

(73) Assignee: Futaba Corporation, Chiba (JP)

( * ) Notice: Subject to any disclaimer, the term of this patent is extended or adjusted under 35 U.S.C. 154(b) by 828 days.

(21) Appl. No.: 11/500,282

(22) Filed: Aug. 8, 2006

(65) Prior Publication Data

US 2007/0035609 A1 Feb. 15, 2007

(30) Foreign Application Priority Data

Aug. 11, 2005 (JP) ............................. 2005-232861

(51) Int. Cl.
*B41J 2/52* (2006.01)
(52) U.S. Cl. ...................... 347/131; 347/240
(58) Field of Classification Search ................. 347/131, 347/183, 240; 400/120.07
See application file for complete search history.

(56) References Cited

OTHER PUBLICATIONS

Machine-generated translation of JP 2003-226040 published on Aug. 12, 2003.*

* cited by examiner

*Primary Examiner*—Huan H Tran
(74) *Attorney, Agent, or Firm*—Bacon & Thomas, PLLC

(57) ABSTRACT

A print head driving method controls a gradation of a print head employing an array light source of a lower resolution and an array light source of a higher resolution based on image data represented by $2^n$ bits, wherein n is zero or a positive integer, and both of the array light sources are gradation-controlled by combining a pulse weight-application method and a pulse accumulation method. Further, a image formation apparatus controls a gradation of a print head employing an array light source of a lower resolution and an array light source of a higher resolution based on image data represented by $2^n$ bits, wherein n is 0 or a positive integer, and both of the array light sources are controlled by a gradation control method employing a simple combination of a pulse weight-application method and a pulse accumulation method.

19 Claims, 12 Drawing Sheets

```
         (300dpi)
  2ⁿ  ┌─────────────────────────────────────────────┐
  n = │ 0 │ 1 │ 2 │ 3 │ 4 │ 4 │ 4 │ 4 │ 4 │ 4 │ 4 │ 4 │ 4 │ 4 │ 4 │ 4 │ 4 │ 4 │ 4 │ 4 │
      ├───┴───┴───┴───┼───┴───┴───┴───┴───┴───┴───┴───┴───┴───┴───┴───┴───┴───┴───┴───┤
  D   │ 1   2   3   4│ 5   6   7   8   9  10 11 12 13 14 15 16 17 18 19│
      ├───────────────ONE CYCLE OF THE GRADATION CONTROL────────────────┤
```

FIG.3A

| D | d1 | d2 | d3 | d4 |
|---|---|---|---|---|
| 19 | ▨ |  | ▨ |  |
| 1 | ▨ |  | ▨ |  |
| 2 |  | ▨ |  | ▨ |
| 3 | ▨ |  | ▨ |  |
| 4 |  | ▨ |  | ▨ |
| 5 | ▨ |  | ▨ |  |
| 6 |  | ▨ |  | ▨ |
| 7 | ▨ |  | ▨ |  |
| 8 |  | ▨ |  | ▨ |
| 9 | ▨ |  | ▨ |  |
| 10 |  | ▨ |  | ▨ |
| 11 | ▨ |  | ▨ |  |
| 12 |  | ▨ |  | ▨ |
| 13 | ▨ |  | ▨ |  |
| 14 |  | ▨ |  | ▨ |
| 15 | ▨ |  | ▨ |  |
| 16 |  | ▨ |  | ▨ |
| 17 | ▨ |  | ▨ |  |
| 18 |  | ▨ |  | ▨ |
| 19 | ▨ |  | ▨ |  |
| 1 | ▨ |  | ▨ |  |
| 2 |  | ▨ |  | ▨ |
| 3 | ▨ |  | ▨ |  |
| 4 |  | ▨ |  | ▨ |
| 5 | ▨ |  | ▨ |  |
| 6 |  | ▨ |  | ▨ |

Rows: $L_{x-1}$ (rows 19–1 at top), $L_x$ (rows 2 through 19), $L_{x+1}$ (rows 1–6 at bottom).

FIG.3B

| D | d1 | d2 | d3 | d4 |
|---|---|---|---|---|
| 19 |  | ▨ |  | ▨ |
| 1 | ▨ |  | ▨ |  |
| 2 |  | ▨ |  | ▨ |
| 3 | ▨ |  | ▨ |  |
| 4 |  | ▨ |  | ▨ |
| 5 | ▨ |  | ▨ |  |
| 6 |  | ▨ |  | ▨ |
| 7 | ▨ |  | ▨ |  |
| 8 |  | ▨ |  | ▨ |
| 9 | ▨ |  | ▨ |  |
| 10 |  | ▨ |  | ▨ |
| 11 | ▨ |  | ▨ |  |
| 12 |  | ▨ |  | ▨ |
| 13 | ▨ |  | ▨ |  |
| 14 |  | ▨ |  | ▨ |
| 15 | ▨ |  | ▨ |  |
| 16 |  | ▨ |  | ▨ |
| 17 | ▨ |  | ▨ |  |
| 18 |  | ▨ |  | ▨ |
| 19 |  | ▨ |  | ▨ |
| 1 | ▨ |  | ▨ |  |
| 2 |  | ▨ |  | ▨ |
| 3 | ▨ |  | ▨ |  |
| 4 |  | ▨ |  | ▨ |
| 5 | ▨ |  | ▨ |  |
| 6 |  | ▨ |  | ▨ |

Rows: $L_{x-1}$, $L_x$, $L_{x+1}$.

PRINT HEAD DRIVING METHOD AND IMAGE FORMATION APPARATUS USING THE SAME

FIELD OF THE INVENTION

The present invention relates to a print head driving method for recording or forming an image on a photo-sensitive recording medium such as a printing paper by driving an array of light emitting elements according to image data, and also relates to an image formation apparatus using the print head driving method.

BACKGROUND OF THE INVENTION

Conventionally, fluorescent luminous tubes, light emitting diodes (LEDs), organic electroluminescent (EL) devices, and so forth are employed as light emitting elements of a print head. A color print head can employ plural kinds of light emitting elements therein. For example, there has been proposed a print head employing an LED as a red light source and fluorescent luminous tubes as a blue light source and a green light source, respectively (see, for example, Japanese Patent Laid-open Application No. 2003-226040: Reference 1). Further, a pulse accumulation method and a pulse weight application method are known to be used for a gradation control of light emitting elements, and there has also been proposed a combination of the two methods (see, for example, Reference 1).

Referring to FIGS. 8 to 10, a conventional print head and a gradation control method therefor will be described.

First, a print head will be schematically explained with reference to FIGS. 8A to 8C.

FIG. 8A shows a configuration of a light recording unit of the print head; FIG. 8B illustrates an array light source in which light emitting elements are disposed in a pattern of an array; and FIG. 8C shows rows of photo-sensitized dots (or photo-exposed dots) formed on a printing paper by being exposed to light emitted from the array light source.

In FIG. 8A, rays of light emitted from an array light source 21R of red light, an array light source 21B of blue light and an array light source 21G of green light are mixed by a dichroic mirror 11 and converged by a lens 12 as a luminous flux LF creating an image on a printing paper 13. The printing paper 13 is moved in a direction indicated by an arrow X1 at a preset speed.

As shown in FIG. 8B, an array light source 21 has m number of light emitting elements dk (k represents an integer in a range from 1 to m) disposed in a pattern of an array. Light emitting elements d1 to dm emit light, while their gradation is controlled based on image data supplied to a driving circuit 22 from a controller 23 such as a CPU. The printing paper 13 is exposed to light emitted from the light emitting elements d1 to dm, whereby photo-sensitized dots (or photo-exposed dots) Pdk (k represents an integer in a range from 1 to m) are formed correspondingly to the light emitting elements d1 to dm during a first cycle of the gradation control, thereby forming a row of photo-sensitized dots Pdl1 on the printing paper 13. Thereafter, the printing paper 13 is moved in a direction of the arrow X1, and a next row of photo-sensitized dots Pdl2 is formed on the paper 13 during a second cycle of the gradation control. In this manner, a single row of photo-sensitized dots is formed for every single cycle of the graduation control.

Now, conventional gradation control methods will be explained with reference to FIGS. 9A and 9B.

FIGS. 9A and 9B describe a pulse accumulation method and a pulse weight-application method, respectively.

FIG. 9A provides a timing chart of data inputs of the driving circuit when executing a gradation control based on image data by employing the pulse accumulation method. The image data is represented by 8 bits.

The gradation is controlled by the light emitting elements of the array light source such that a single row (a single line) of photo-sensitized dots is formed for each cycle of the gradation control Lx. A single cycle of the gradation control Lx is divided into: a light emitting time T1 during which the light emitting elements are operated to emit light; and a non-emission time T2 during which the light emission thereof is stopped. Further, although the light emitting time is defined as a time period for operating the light emitting elements, it can also be regarded as a time period for exposing a printing paper to light or forming photo-sensitized dots on the printing paper by exposing the printing paper to the light.

The light emitting time T1 is divided into 255 sections, thereby performing the gradation control based on 255 steps of the gradation. For example, in case the image data is set to be 0, the driving circuit of the light emitting elements maintains the light emitting elements at "off" while a gradation count increases from 0 to 254, i.e., during the whole light emitting time T1. However, in case the image data is set to be 3, the driving circuit operates the light emitting elements to emit light while the gradation count increases from 0 to 2. Further, in case the image data is set to be 255, the driving circuit operates the light emitting elements to emit light while the gradation count increases from 0 to 254.

FIG. 9B provides a timing chart of data inputs of the driving circuit when executing a gradation control based on image data by employing the pulse weight-application method. The image data is represented by 4 bits.

The image data is expressed by 4 bits of binary numbers, and different light emitting time lengths (weights) are set for each bit. A light emitting time T1 is divided into four time intervals in a manner that the respective time intervals are corresponding to pulses whose widths are equal to $2^n$ (n is an integer in a range from 0 to the number of bits representing the image data), and the respective light emitting time lengths are determined by combinations of the pulses. For example, if the image data is "1", the driving circuit operates the light emitting elements to emit light during a time period corresponding to a pulse whose width is $2^0$. Further, if the image data is "5", the driving circuit operates the light emitting elements to emit light during two time periods corresponding to pulses whose widths are $2^0$ and $2^2$, respectively.

Moreover, if the image data is represented by 8 bits, the light emitting time T1 is divided into eight time intervals, and eight different light emitting time lengths are divided in a manner similar to the above-described case.

As described above, the gradation control based on the pulse accumulation method is conducted by dividing the light emitting time T1 into 255 sections if the image data is represented by 8 bits. As a result, the resolution is enhanced, allowing a high image quality. However, since a large number of image data must be transmitted from the control circuit to the driving circuit, the time required for the transmission of the image data is increased, which in turn increases the printing time.

On the other hand, in accordance with the gradation control based on the pulse weight-application method, the number of transmitted image data is only 8 if the image data is represented by 8 bits. Therefore, the time required for the transmission of the image data is shortened, which in turn reduces the printing time. However, the resolution is also reduced, and the quality of printed image is degraded.

To resolve the drawbacks, there has been proposed a method combining the pulse accumulation method and the pulse weight-application method, in which a gradation control is conducted by changing a ratio of the combination of the two methods according to a required printing speed and a required image quality. Hereinafter, a ratio of the pulse weight-application method with respect to the pulse accumulation method in the above-described combination of the two methods will be referred to as a "combination ratio" of the pulse weight-application method.

The resolution of the array light source employed in the print head varies as the number of light emitting elements or light emitting dots per a unit length of a single row of the light emitting elements or the light emitting dots changes depending on the type of the light emitting elements. For example, fluorescent luminous tubes on the market typically have a resolution of 300 dpi (300 dots per an inch), and LEDs on the market typically have a resolution of 600 dpi.

FIGS. 10A and 10B illustrate rows of light emitting elements of two array light sources having resolutions of 300 dpi and 600 dpi, respectively, wherein the number of the light emitting elements in FIG. 10A is m and the number of the light emitting elements in FIG. 10B is twice as many as that in FIG. 10A, i.e., 2m. With regard to a fluorescent luminous tube and an LED employed as the array light sources of the print head, an emitting energy of red light emitted from the fluorescent luminous tube is weak, whereas an emitting energy of red light emitted from the LED is relatively strong. Thus, the LED is generally used for emitting red light, whereas the fluorescent luminous tube is employed for emitting green and/or blue light. Considering the above facts, the fluorescent luminous tube having the resolution of 300 dpi and the LED having the resolution of 600 dpi are often employed together in a single print head.

In the print head employing the two array light sources respectively having resolutions of 300 dpi and 600 dpi, two light emitting elements (e.g., d1 and d2) in FIG. 10B correspond to one light emitting element (e.g., d1) in FIG. 10A. Accordingly, two light emitting elements of the array light source of 600 dpi form two photo-sensitized dots corresponding to one photo-sensitized dot formed by a single light emitting element of the array light source of 300 dpi. That is, two photo-sensitized dots of the resolution of 600 dpi correspond to one photo-sensitized dot of the resolution of 300 dpi.

Since the fluorescent luminous tube and the LED have different resolutions, the advantage of combining the pulse accumulation method and the pulse weight-application method may be difficult to realize depending on the combination method when using the two components in a single print head.

FIG. 10C shows a time period during which image data is transmitted (hereinafter, referred to as "data transmission time") in accordance with a conventional gradation control method combining the pulse accumulation method and the pulse weight-application method in case where the array light sources have the resolutions of 300 dpi; and FIG. 10D illustrates the same in case where the array light sources have the resolutions of 600 dpi. The image data is represented by 8 bits. Further, the time periods designated as "one cycle of the gradation control" in FIGS. 10C and 10D only show the data transmission times, and the non-emission times are omitted therefrom for simplicity.

As described above, FIG. 10C describes the case of using the array light sources having the resolution of 300 dpi, whereas FIG. 10D depicts the case of using the array light source having the resolution of 600 dpi. In both cases, lower 4 bits of the 8-bit data are controlled by the pulse weight-application method, whereas higher 4 bits thereof are controlled by the pulse accumulation method. During a time period when the pulse weight-application method is applied to the lower four bits, data of $2^0$, $2^1$, $2^2$ and $2^3$ are respectively transmitted, which means that the number of transmission of the image data is equal to 4 (D=4). On the other hand, during a time period when the pulse accumulation method is applied to the higher four bits, data of $2^4$ is transmitted 15 times (D=15). Accordingly, the total number of the transmissions of the image data amounts to 19.

Though the number of transmission of the image data is identical in both cases shown in FIGS. 10C and 10D, the resolution in the case shown in FIG. 10D is two times higher than that shown in FIG. 10C. Thus, the amount of the image data in the case shown in FIG. 10D is doubled compared to that shown in FIG. 10C. Thus, the data transmission time in the case shown in FIG. 10D is also doubled compared to the case shown in FIG. 10C. Accordingly, in order to reduce the data transmission time in the case shown in FIG. 10D thereby being identical to the transmission time in the case shown in FIG. 10C, the data transmission in the case shown in FIG. 10D is needed to be set at a speed two times faster than that in the case shown in FIG. 10C by amplifying a driving frequency of a driving circuit of light emitting elements. In practice, however, there is an upper limit of the performance such as the driving frequency of a driver IC. Therefore, there are occasions where the driving frequency cannot be doubled up. Furthermore, if a high-frequency driver IC is used, the cost increases, and the entire circuit including a data transmission circuit is required to be processed faster. In addition, a measure for suppressing noise is needed for the high-frequency driver IC. Therefore, the entire production cost of the print head increases, thereby making the amplification of the driving frequency of the driving circuit impractical.

SUMMARY OF THE INVENTION

It is, therefore, an object of the present invention to provide a print head driving method used for a print head for controlling a gradation by combining a pulse accumulation method and a pulse weight-application method, allowing same time periods to be allotted for the transmission of image data to respective array light sources having different resolutions by using a control circuit without degrading a quality of image; and an image formation apparatus using such print head driving method.

In accordance with one aspect of the present invention, there is provided a print head driving method for controlling a gradation of a print head employing an array light source of a lower resolution and an array light source of a higher resolution based on image data represented by $2^n$ bits, wherein n is zero or a positive integer, and both of the array light sources are gradation-controlled by a gradation control method employing a simple combination of a pulse weight-application method and a pulse accumulation method.

Preferably, a combination ratio of the pulse weight-application method applied to the array light source having the higher resolution is set to be larger than that of the array light source having the lower resolution.

In accordance with another aspect of the present invention, there is provided a print head driving method for controlling a gradation of a print head employing an array light source of a lower resolution and an array light source of a higher resolution based on image data represented by $2^n$ bits, wherein n is 0 or a positive integer, and both of the array light sources are gradation-controlled by a pulse accumulation pulse weight-application method.

Preferably, weights used for the pulse accumulation pulse weight-application method applied to the array light source having the lower resolution are $2^0$ and one or more of $2^1$ to $2^a$, and weights used for the pulse accumulation pulse weight-application method applied to the array light source having the higher resolution are $2^0$ and one or more of $2^1$ to $2^b$ (b is a positive integer), wherein a and b are positive integers, b is set to be larger than a (b>a), the number of the weight $2^0$ applied to the array light source having the higher resolution is set to be larger than that of the array light source having the lower resolution, and the number of transmissions of the image data of the array light source having the higher resolution is set to be smaller than that of the array light source having the lower resolution.

In accordance with still another aspect of the present invention, there is provided a print head driving method for controlling a gradation of a print head employing an array light source of a lower resolution and an array light source of a higher resolution based on image data represented by $2^n$ bits, wherein n is 0 or a positive integer, and one of the array light source is controlled by a gradation control method employing a pulse accumulation pulse weight-application method whereas the other is controlled by a gradation control method employing a simple combination of a pulse weight-application method and a pulse accumulation method.

Preferably, the array light source having the lower resolution is controlled by the gradation control method employing the pulse accumulation pulse weight-application method, weights used therefor being $2^0$ and one or more of $2^1$ to $2^a$, and the array light source having the higher resolution is controlled by the gradation control method employing a simple combination of the pulse weight-application method and the pulse accumulation method, weights used therefor being one or more of $2^1$ to $2^c$, wherein a and c is positive integers, c is set to be larger than a, and the number of transmissions of the image data of the array light source having the higher resolution is set to be smaller than that of the array light source having the lower resolution.

Preferably, the array light source having the higher resolution activates even-numbered light emitting elements and odd-numbered light emitting elements alternately once for each cycle of gradation control.

Preferably, the array light source having the higher resolution activates even-numbered light emitting elements and odd numbered light emitting elements alternately once for each bit of the image data.

Preferably, the order of activating the odd-numbered light emitting elements and the even-numbered light elements is changed for every single cycle of gradation control.

In accordance with still another aspect of the present invention, there is provided an image formation apparatus for controlling a gradation of a print head employing an array light source of a lower resolution and an array light source of a higher resolution based on image data represented by $2^n$ bits, wherein n is 0 or a positive integer, and both of the array light sources are controlled by a gradation control method employing a simple combination of a pulse weight-application method and a pulse accumulation method.

In accordance with still another aspect of the present invention, there is provided an image formation apparatus for controlling a gradation of a print head employing an array light source of a lower resolution and an array light source of a higher resolution based on image data expressed by $2^n$ bits, wherein n is 0 or a positive integer, and both of the array light sources are controlled by a gradation control method employing a pulse accumulation pulse weight-application method.

In accordance with still another aspect of the present invention, there is provided an image formation apparatus for controlling a gradation of a print head employing an array light source of a lower resolution and an array light source of a higher resolution based on image data represented by $2^n$ bits, wherein n is 0 or a positive integer, and one of the array light source is controlled by a gradation control method employing a pulse accumulation pulse weight-application method, whereas the other is controlled by a gradation control method employing a simple combination of a pulse weight-application method and a pulse accumulation method.

In accordance with the present invention, a gradation of a print head employing an array light source of a lower resolution and an array light source of a higher resolution is controlled by simply combining a pulse weight-application method and a pulse accumulation method, and a combination ratio of the pulse weight-application method applied to the array light source having the higher resolution is set to be greater than that of the pulse weight-application method applied to the array light source having the lower resolution. Thus, it is possible to form an image at a proper speed without deteriorating a quality of the image.

In accordance with the present invention, a gradation of a print head employing an array light source of a lower resolution and an array light source of a higher resolution is controlled by simply combining a pulse weight-application method and a pulse accumulation method, and the odd-numbered light emitting elements and the even-numbered light elements are driven alternately once for each cycle of the gradation control. Thus, it is possible to set a combination ratio of the pulse weight-application method applied to the array light source having the higher resolution so as to be equal to that of the pulse weight-application method applied to the array light source having the lower resolution.

In accordance with the present invention, a gradation of a print head employing an array light source of a lower resolution and an array light source of a higher resolution is controlled by simply combining a pulse weight-application method and a pulse accumulation method, and the odd-numbered light emitting elements and the even-numbered light elements are driven alternately once for each bit during the gradation control. Thus, it is possible to set a combination ratio of the pulse weight-application method applied to the array light source having the higher resolution to be equal to that of the pulse weight-application method applied to the array light source having the lower resolution. Further, steps of the gradation of photo-sensitized dots can be made uniform.

In accordance with the present invention, a gradation of a print head employing an array light source of a lower resolution and an array light source of a higher resolution is controlled by simply combining a pulse weight-application method and a pulse accumulation method, the odd-numbered light emitting elements and the even-numbered light elements are driven alternately once for each bit during the gradation control, and the order of activating the odd-numbered light emitting elements and the even-numbered light elements is changed for every single cycle of gradation control. Thus, it is possible to set a combination ratio of the pulse weight-application method for the array light sources having the higher resolution to be same as that for the array light sources having the lower resolution. Further, steps of the gradation of photo-sensitized dots can be made uniform.

In accordance with the present invention, a gradation of a print head employing an array light source of a lower resolution and an array light source of a higher resolution is controlled by a pulse accumulation pulse weight-application method. Thus, the degree of freedom for setting the cycle of the gradation control increases. Further, the gradation control time can be set in response to any given gradation number, and more specifically.

In accordance with the present invention, a gradation of a print head employing an array light source of a lower resolution and an array light source of a higher resolution is controlled by a pulse accumulation pulse weight-application method. Further, in the array light source of the higher resolution, the odd-numbered light emitting elements and the even-numbered light elements are driven alternately once for each cycle of the gradation control or once for each bit during the gradation control, or the odd-numbered light emitting elements and the even-numbered light elements are driven once for each bit during the gradation control and the order of activating the odd-numbered light emitting elements and the even-numbered light elements is changed for every single cycle of gradation control. Thus, steps of the gradation of photo-sensitized dots can be made uniform.

BRIEF DESCRIPTION OF THE DRAWINGS

The above and other objects and features of the present invention will become apparent from the following description of preferred embodiments given in conjunction with the accompanying drawings, in which:

FIGS. 3A to 3E explain a gradation control method in accordance with a third preferred embodiment of the present invention;

FIGS. 9A and 9B explain conventional gradation control methods, wherein FIG. 9A illustrates a pulse accumulation method and FIG. 9B depicts a pulse weight-application method;

DETAILED DESCRIPTION OF THE PREFERRED EMBODIMENTS

Hereinafter, preferred embodiments of the present invention will be described with reference to FIGS. 1A to 7B.

First Preferred Embodiment

FIGS. 1A to 1D describe a gradation control method in accordance with a first preferred embodiment of the present invention.

Figure 1A:
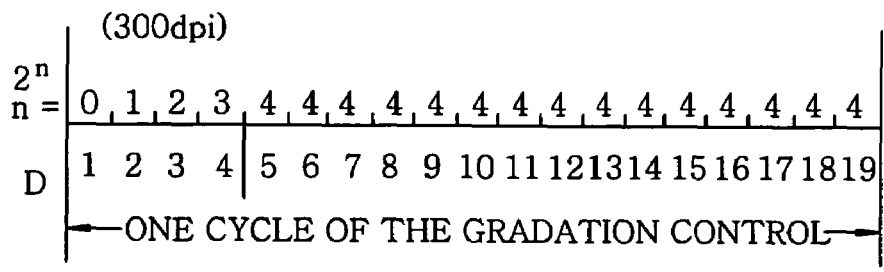
FIGS. 1A to 1D illustrate single cycles of a gradation control in accordance with a first preferred embodiment of the present invention.
Figure 1B:
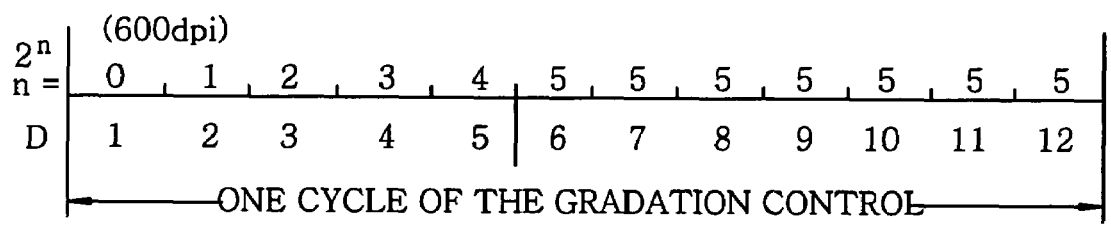
Figure 1C:
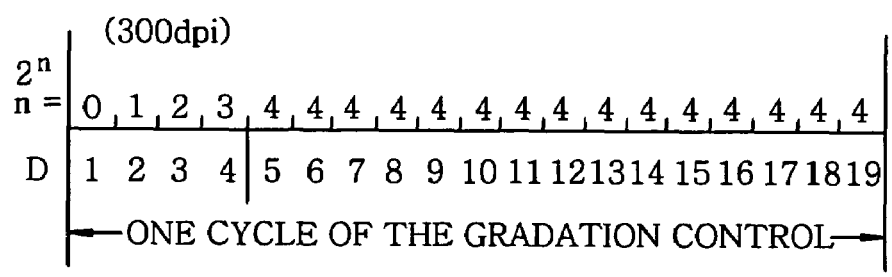
Figure 1D:
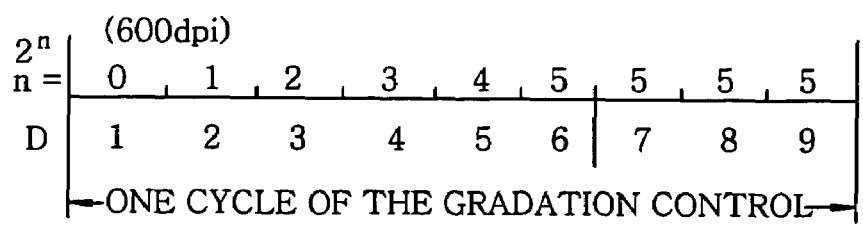

The gradation control of array light sources shown therein is based on 8-bit image data. FIGS. 1A and 1C describe a case of using an array light source having a resolution of 300 dpi, whereas FIGS. 1B and 1D depict a case of using an array light source having a resolution of 600 dpi. Further, driving frequencies of driving circuits of the array light sources are same in both cases, and the time periods designated as "one cycle of the gradation control" in FIGS. 1A to 1D only show data transmission times, and the non-emission times are omitted therefrom for simplicity.

The array light source having the resolution of 300 dpi is used for generating, e.g., green or blue light, and fluorescent luminous tubes are employed therein. The array light source having the resolution of 600 dpi is used for generating red light, and LEDs are employed therein.

In the exemplary cases depicted in FIGS. 1A to 1D, the image data is represented by $2^n$ (n is a non-negative integer) and of 8 bits (i.e., $0 \leq n \leq 8$). FIG. 1A depicts a case of gradation-controlling lower 4 bits by the pulse weight-application method and upper 4 bits by the pulse accumulation method. During the time of applying the pulse weight-application method to the lower 4 bits, data of $2^0$, $2^1$, $2^2$ and $2^3$ are transmitted one at a time (D=4), and during the time of applying the pulse accumulation method to the upper 4 bits, data of $2^4$ is transmitted 15 times. Accordingly, the total number of the transmissions of the image data amounts to 19.

Further, FIG. 1B describes a case of gradation-controlling lower 5 bits of the 8-bit image data by the pulse weight-application method and upper 3 bits of the 8-bit image by the pulse accumulation method. During the time of applying the pulse-weight application method to the lower 5 bits, data of $2^0$, $2^1$, $2^2$, $2^3$ and $2^4$ are transmitted one at a time (D=5), and during the time of applying the pulse accumulation method to the upper 3 bits, data of $2^5$ is transmitted seven times (D=7). Accordingly, the total number of the transmissions of the image data amounts to 12.

Since the lower 5 bits are gradation-controlled by the pulse weight-application method in the case shown in FIG. 1B whereas the lower 4 bits are gradation-controlled by the pulse accumulation method in the case shown in FIG. 1A, the combination ratio of the pulse weight-application method is higher in the case shown in FIG. 1B than in the case shown in FIG. 1A.

FIG. 1C describes a case of gradation-controlling lower 4 bits of the 8-bit image data by the pulse weight-application method and upper 4 bits by the pulse accumulation method; and FIG. 1D depicts a case of gradation-controlling lower 6 bits of the 8-bit image data by the pulse weight-application method and upper 2 bits by the pulse accumulation method.

The total number of the data transmission shown in the case shown in FIG. 1C amounts to 19, whereas that of the case shown in FIG. 1D amounts to 9. Therefore, the transmission time of the image data in the case shown in FIG. 1D is shorter than that in the case shown in FIG. 1C. In addition, the total data transmission times in the case shown in FIGS. 1C and 1D are shorter than those in the case shown in FIGS. 1A and 1B. However, since the combination ratio of the pulse weight-application method in the case shown in FIG. 1D is higher than that in the case shown in FIG. 1B, light emission times (pulse widths) of the upper bits are increased, thereby deteriorating the resolution. Thus, the quality of image in the case shown in FIGS. 1C and 1D is lowered more than that of FIGS. 1A and 1B.

It is preferable that a single cycle of the gradation control (which is approximately the data transmission time) of the array light source of the higher resolution is made identical to that of the array light source of the lower resolution. Therefore, if there is a difference therebetween, it is preferable to minimize the difference by, for example, adjusting driving frequencies. In such case, the ratio of the difference between a longer and a shorter single cycles of the gradation control to the longer single cycle of the gradation control is preferably set to be smaller than about 5% (i.e., the longer cycle of the gradation control is set to be smaller than about 105% of the shorter cycle of the gradation control); and, more particularly, smaller than 1% (i.e., the longer cycle of the gradation control is set to be smaller than about 101% of the shorter cycle of the gradation control).

Among the cases shown in FIGS. 1A to 1D, by setting the combination ratios of the pulse weight-application method as described above, the driving frequencies for the driving circuits and the data transmission times in the cases of FIGS. 1A and 1C can be made close to those in the cases of FIGS. 1B and 1D.

The combination ratio of the pulse weight-application method with respect to the pulse accumulation method is not limited to those shown in FIGS. 1A to 1D. Preferably, the combination ratio of the pulse weight-application method is set to be greater in case of using the array light source of a higher resolution (e.g., 600 dpi) than a lower resolution (e.g., 300 dpi).

Second Preferred Embodiment

Figure 2A:
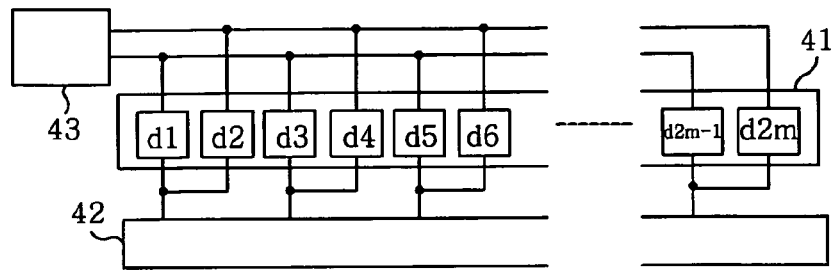
FIGS. 2A and 2B describe a gradation control method in accordance with a second preferred embodiment of the present invention.
Figure 2B:
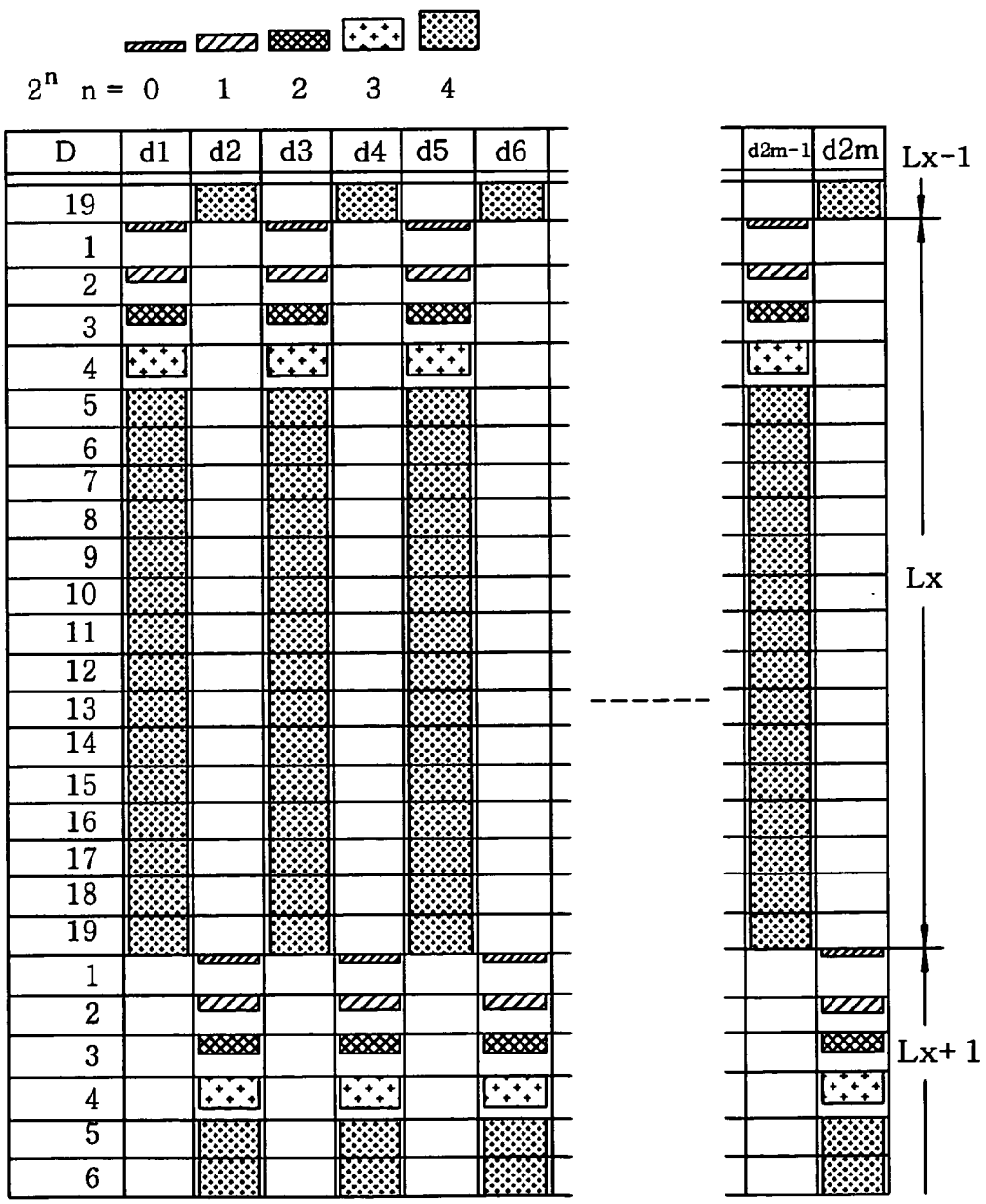

FIGS. 2A and 2B describe a gradation control method in accordance with a second preferred embodiment of the present invention, in which the pulse accumulation method and the pulse weight-application method are combined, and an interlace method for alternately driving odd-numbered light emitting elements and even-numbered light emitting elements alternately once for each cycle of gradation control is applied thereto.

Moreover, though a print head in this embodiment employs both an array light source having a resolution of 300 dpi and an array light source having a resolution of 600 dpi, the interlace method is only applied to the array light source having the resolution of 600 dpi. FIGS. 2A and 2B only illustrate the case of using the 600 dpi array light source.

FIG. 2A shows a driving circuit of an array light source 41 in which light emitting elements d1 to d2$m$ formed of LEDs are installed in a pattern of an array. The array light source 41 has a resolution of 600 dpi.

As for the light emitting elements d1 to d2$m$, every two neighboring elements (i.e., d1 and d2, d3 and d4, . . . , d2$m$-1 and d2$m$) are set as pairs, and anodes of light emitting elements in the respective pairs are commonly connected to an anode driving circuit 42, whereas cathodes of the light emitting elements in the respective pairs are connected to respective output terminals of a cathode driving circuit 43. The cathode driving circuit 43 drives (selects) odd-numbered light emitting elements and even-numbered light emitting elements alternately.

FIG. 2B illustrates a bit pattern appearing when gradation-controlling the light emitting elements d1 to d2$m$ shown in FIG. 2A based on a 8-bit image data by applying the interlace method thereto in accordance with this embodiment.

The light emitting elements d1 to d2$m$ of FIG. 2B are equivalent to the light emitting elements d1 to d2$m$ of FIG. 2A. Further, D represents the number of transmissions of the image data, and five kinds of marked rectangles represent image data $2^n$ when n equals to 0, 1, 2, 3 and 4, respectively. Also, Lx−1, Lx and Lx+1 represent three consecutive cycles of gradation control. Further, although the cycle of the gradation control is a time period for controlling the operations of the light emitting elements d1 to d2$m$, it can also be defined as a photo-exposing period for forming one row of photo-sensitized dots or photo-exposed dots on a printing paper or the like in the aspect of a photo-sensitive storage medium such as the printing paper. That is, the cycle of the gradation control can be understood as a photo-exposing period for forming one line of photo-sensitized dots or photo-exposed dots.

In case shown in FIG. 2B, the pulse weight-application method is applied to lower 4 bits of 8 bits of the image data, whereas the pulse accumulation method is applied to the rest of the upper 4 bits. Further, the number D of the transmissions of data during the single cycle of the gradation control Lx is 19. When the number D of the transmission of the image data is 1, 2, 3 or 4, that is, during the transmission of the lower 4 bits of the 8 bits, the image data $2^0$, $2^1$, $2^2$ and $2^3$ are transmitted one at a time in accordance with the pulse weight-application method. On the other hand, when the number D of the transmissions of the image data ranges from 5 to 19, i.e., during the transmission of the upper 4 bits of the 8 bits, image data $2^4$ is transmitted repeatedly in accordance with the pulse accumulation method. Further, during the cycle of the gradation control Lx, odd-numbered light emitting elements (d1, d3, d5, . . . , d2$m$−1) are activated to emit light, whereas even-numbered light emitting elements (d2, d4, d6, . . . , d2$m$) are activated to emit light during the cycle of the gradation control Lx+1.

Further, in case shown in FIG. 2B, by alternately driving the array light source having the resolution of 600 dpi once for each cycle of the gradation control in accordance with the interlace method, the array light source of 600 dpi can be operated under the same condition as that of the array light source having the resolution of 300 dpi. That is, the combination ratio of the pulse weight-application method with respect to the pulse accumulation method applied to the array light source of 300 dpi can be set to be same as that applied to the array light source of 600 dpi, and the driving frequency of the driving circuit in the array light source of 300 dpi can also be set to be same as that in the array light source of 600 dpi.

Further, if the array light source 41 of the 600 dpi is driven alternately once for each cycle of the gradation control in accordance with the interlace method, the brightness is reduced by half compared to a case of static driving method (i.e., driving method in which the interlace method is not applied), but the decrease in the brightness can be compensated by increasing the currents of the LEDs. Although the interlace method causes deviations in the center of emitting positions, the same level of brightness as obtained in accordance with the static driving method can be achieved by compensating the decrease in the brightness as described above.

Third Preferred Embodiment

FIGS. 3A to 3E illustrate a gradation control method in accordance with a third preferred embodiment of the present invention. The method combines a driving method for alternating odd-numbered light emitting elements and even-numbered light emitting elements for each bit as well as combining a pulse accumulation method and a pulse weight-application method.

Further, although a print head in this embodiment employs both array light sources having a resolution of 300 dpi and an array light source having a resolution of 600 dpi, the method for alternating the light emitting elements once for each bit is applied only to the array light source of 600 dpi. Further, FIGS. 3A to 3E illustrate the gradation control of the array light source of 600 dpi, and only four light emitting elements d1 to d4 among light emitting elements d1 to d2$m$ are shown therein.

Hereinafter, FIG. 3A will be explained first.

Figure 3C:
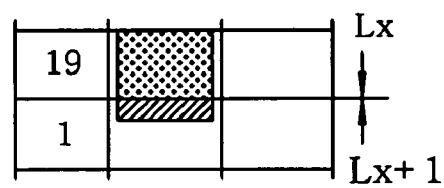
Figure 3D:
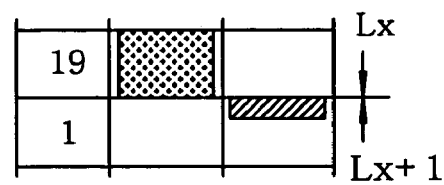
Figure 3E:
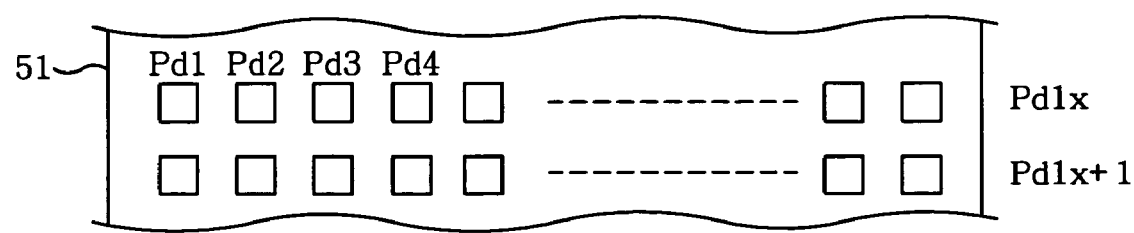

During a cycle of the gradation control Lx, image data is transmitted 19 times (D=19). If the number D of the transmissions is an odd number, i.e., D=1, 3, . . . , 19, odd-numbered light emitting elements such as d1 and d3 are driven to emit light, whereas even-numbered light emitting elements such as d2 and d4 are driven to emit light if the number D of the transmissions is an even number, i.e., D=2, 4, . . . , 18. In other words, the even-numbered light emitting elements and the odd-numbered light emitting elements are activated alternately once for each bit during the cycle of the gradation control Lx. As a result, a row Pdlx of photo-sensitized dots is formed on a printing paper 51 during the cycle of the gradation control Lx, as shown in FIG. 3E. Specifically, photo-sensitized dots Pd1, Pd3 and so forth are formed by the odd-numbered light emitting elements d1, d3 and so forth, and photo-sensitized dots Pd2, Pd4 and so forth are formed by even-numbered light emitting elements d2, d4 and so forth. Likewise, a next row Pdlx+1 of photo-sensitized dot is formed during a next cycle of the gradation control Lx+1.

In case a single print head employs the array light sources of 600 dpi and 300 dpi, the array light source of 600 dpi is activated based on image data whose resolution is equivalent to that of the array light source of 300 dpi. Therefore, two light emitting elements (e.g., d1 and d2) of the array light source of 600 dpi are equivalent to one light emitting element of the array light source of 300 dpi. Accordingly, the pair of the photo-sensitized dots Pd1 and Pd2 and the pair of the photo-sensitized dots Pd3 and Pd4 are respectively equivalent to one photo-sensitized dot of the array light source of 300 dpi. That is, two photo-sensitized dots formed by the array light source of 600 dpi are corresponding to one photo-sensitized dot formed by the array light source of 300 dpi.

In accordance with the gradation control method shown in FIG. 3A, the odd-numbered light emitting elements and the even-numbered light emitting elements are driven to emit light alternately during the cycle of the gradation control Lx in a manner represented by checkered patterns illustrated in FIG. 3A. As a result, pairs of photo-sensitized dots Pd1 and Pd2 and Pd3 and Pd4 are formed, so that the gradation of the row Pdlx of photo-sensitized dots can be made uniform, thereby improving the image quality.

Further, in accordance with this gradation control method, when one of the two groups of the even-numbered and odd-numbered light emitting elements is activated, a driving circuit of the other group can prepare for a next operation of light emission by receiving next image data and storing it in a latch circuit or the like. Thus, transmission time of image data can be reduced. Furthermore, since the odd-numbered light emitting elements and the even-numbered light emitting elements are activated alternately, the array light source of 600 dpi can be operated at an identical driving frequency as that of the array light source of 300 dpi.

Figure 4:
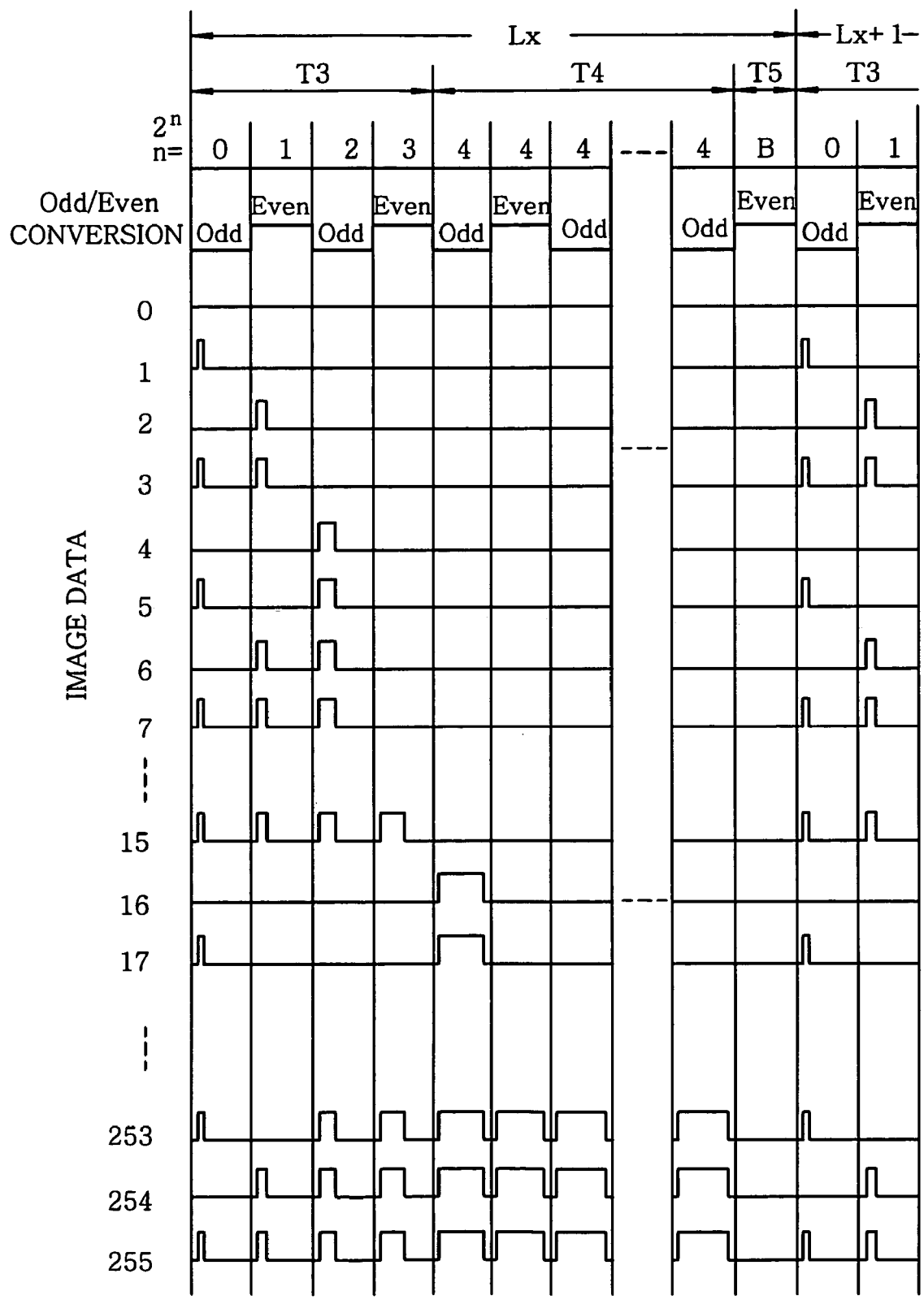
FIG. 4 provides a timing chart of the gradation control method shown in FIG. 3A.

FIG. 4 is a timing chart describing the gradation control method shown in FIG. 3A. Within the cycle of the gradation control Lx, a period T3 is assigned for performing the pulse weight-application method; a period T4 is assigned for performing the pulse accumulation method; and a period T5 is the non-emission time. During the cycle of the gradation control Lx, the odd-numbered light emitting elements and the even-numbered light emitting elements are driven to emit light alternately once for each bit, so that the gradation can be adjusted on a basis of 0 to 255 steps of the gradation during the cycle of the gradation control Lx. Further, the non-emission time is optional, and it can be omitted depending on the driving method.

Now, a gradation control method shown in FIG. 3B will be explained.

The gradation control method shown in FIG. 3B is basically same as that shown in FIG. 3A, except that the order of driving the odd-numbered light emitting elements and the even-numbered light elements is changed for every time the cycle of the gradation control shifts from one to another.

In accordance with the gradation control method shown in FIG. 3A, odd-numbered light emitting elements d1, d3 and so forth are activated not only when the cycle of the gradation control Lx is started (i.e., at a time when D=1) but also when the next cycle of the gradation control Lx+1 is started, thereby causing an unwanted bias in the gradation. To correct the bias in the gradation, when the cycle of the gradation control Lx+1 is started, the gradation control method shown in FIG. 3B is configured to activate even-numbered light emitting elements d2, d4 and so forth, instead of the odd-numbered light emitting elements. That is, the order of driving the odd-numbered light emitting elements and the even-numbered light emitting elements is changed every time the cycle of the gradation control shifts from one to another.

By changing the order of driving the odd-numbered light emitting elements and the even-numbered light emitting elements once for each cycle of the gradation control, the bias in the gradation can be corrected, so that the gradation can be made mode uniform.

Figure 5:
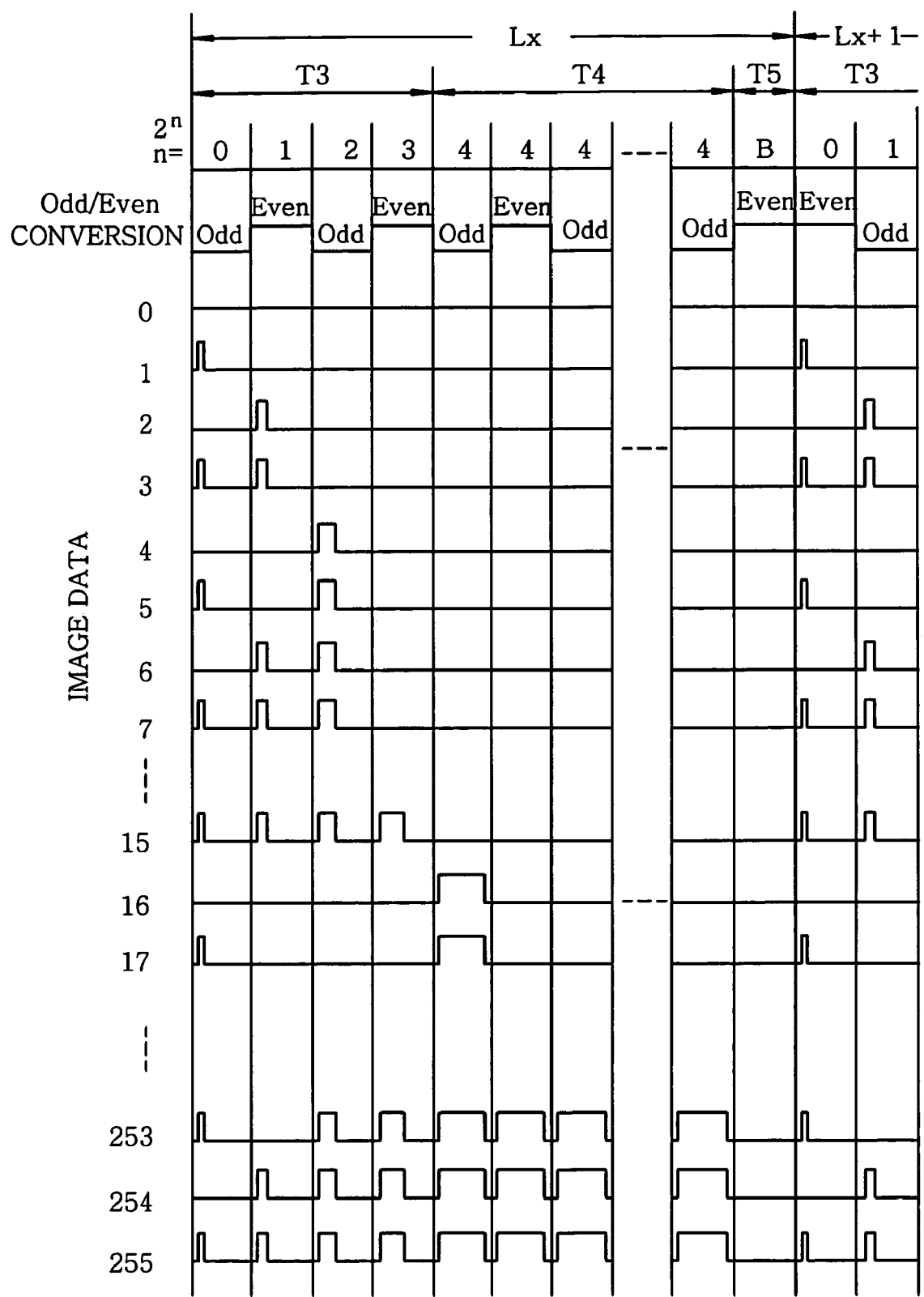
FIG. 5 sets forth a timing chart of the gradation control method shown in FIG. 3B.

FIG. 5 is a timing chart describing the gradation control method shown in FIG. 3B.

The timing chart of FIG. 5 is basically identical to the timing chart of FIG. 4, except that the order of driving the odd-numbered light emitting elements and the even-numbered light emitting elements is changed when the cycle of the gradation control shifts from Lx to Lx+1. That is, the odd-numbered light emitting elements get activated at a start of the cycle of the gradation control Lx, whereas the even-numbered light emitting elements get activated at a start of the cycle of the gradation control Lx+1.

Further, in case of driving the light emitting elements by applying the interlace method as in the embodiments described in FIGS. 2A to 3E, the resolution of the higher-resolution array light source is preferably set to be an integer multiple in numbers compared to the lower-resolution array light source.

Fourth Preferred Embodiments

A fourth preferred embodiment of the present invention will be described with reference to FIGS. 6A to 7D.

The fourth preferred embodiment differs from the first to the third preferred embodiments in the manner of combining the pulse weight-application method and the pulse accumulation method.

First, the ways of combining the pulse weight-application method and the pulse accumulation method in accordance with the first to the third preferred embodiment as well as those in accordance with the fourth preferred embodiment will be explained with reference to FIGS. 6A and 6B. In the examples depicted in FIGS. 6A and 6B, gradation controls are based on 32 steps of gradation. Further, the time periods designated as "one cycle of the gradation control" in FIGS. 6A and 6B and FIGS. 7A to 7D only show the data transmission times, and the non-emission times are omitted therefrom for simplicity.

Figure 6A:
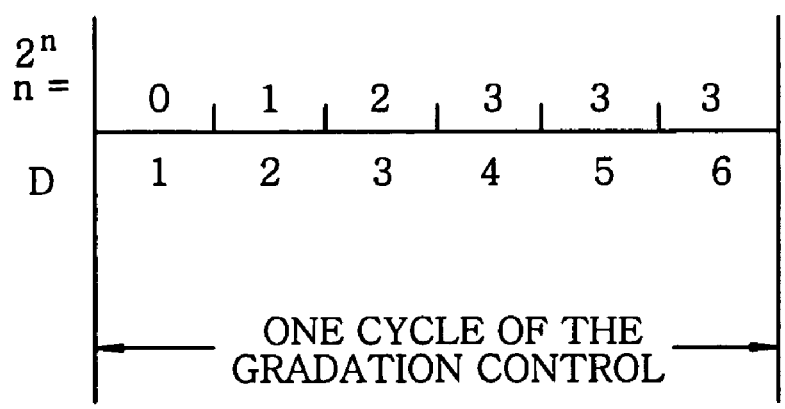
FIGS. 6A and 6B describe single cycles of gradation controls in accordance with the first to the third preferred embodiment of the present invention and in accordance with a fourth preferred embodiment of the present invention, respectively.
Figure 6B:
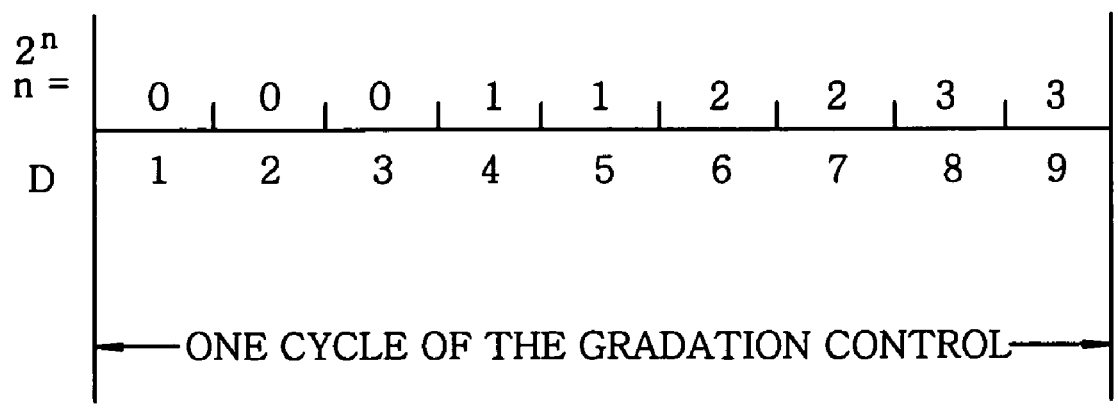

FIG. 6A describes a combination of the pulse weight-application method and the pulse accumulation method in accordance with the first to the third preferred embodiments, while FIG. 6B describes a combination thereof in accordance with the fourth preferred embodiment of the present invention.

In case shown in FIG. 6A, the pulse weight-application method is applied to lower 3 bits among total 5 bits of image data, and the pulse accumulation method is applied to upper 2 bits. Further, each of the weights $2^0$, $2^1$ and $2^2$ are applied only once during the pulse weight-application method. That is, during the time period when the weights $2^0$, $2^1$ and $2^2$ are applied, a single pulse having a pulse width corresponding to $2^0$, another single pulse having a pulse width corresponding to $2^1$ and another single pulse having a pulse width corresponding to $2^2$ are transmitted.

However, in case shown in FIG. 6B, three of weight $2^0$, two of weight $2^1$, two of weight $2^2$ and two of weight $2^3$ are applied, respectively. That is, during the time period when the weights $2^0$, $2^1$, $2^2$ and $2^3$ are applied, three pulses having a pulse width corresponding to $2^0$, two pulses having a pulse width corresponding to $2^1$, two pulses having a pulse width corresponding to $2^2$, and finally, two pulses having a pulse width corresponding to $2^3$ are transmitted. Accordingly, the gradation control method shown in FIG. 6B not only adopts the pulse weight-application method but also applies the pulse accumulation method to each weight.

Hereinafter, the kind of combination used in the first to the third preferred embodiment for simply combining the pulse weight-application method and the pulse accumulation method will be referred to as "simple combination", and the gradation control method of the fourth preferred embodiment shown in FIG. 6B will be referred to as "pulse accumulation pulse weight-application method".

In accordance with the pulse accumulation pulse weight-application method shown in FIG. 6B, the number of the weights transmitted during the transmission time of each weight is not limited to the example in FIG. 6B but can be modified in various ways. For example, the number of transmissions of some of the weights can be set to be 0. Accordingly, the pulse accumulation pulse weight-application method can be adapted in response to any given gradation number. Further, since the degree of freedom for setting the cycle of the gradation control increases in accordance therewith, the gradation control time can be set more specifically.

Figure 7A:
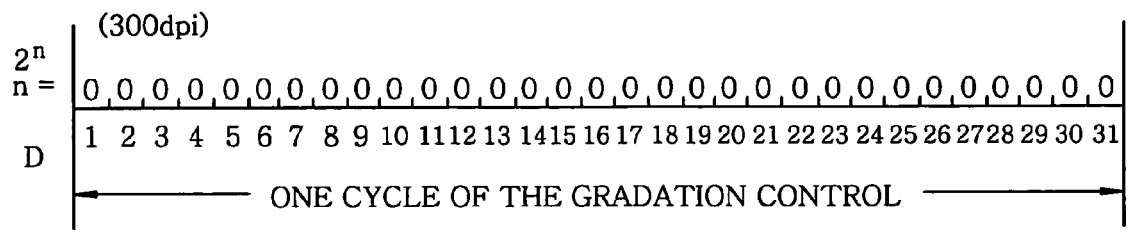
FIGS. 7A to 7D illustrate single cycles of gradation controls in accordance with the fourth preferred embodiment of the present invention.
Figure 7B:
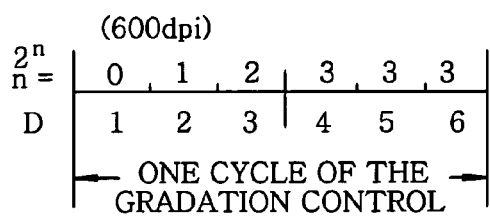
Figure 7C:
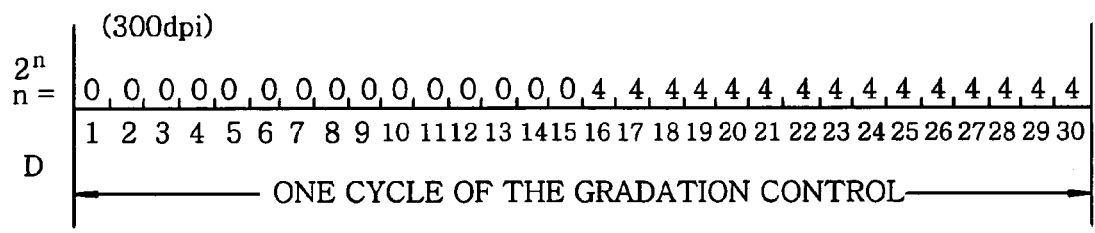
Figure 7D:
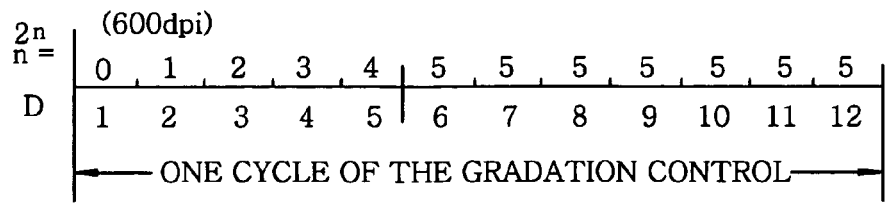
Figure 8A:
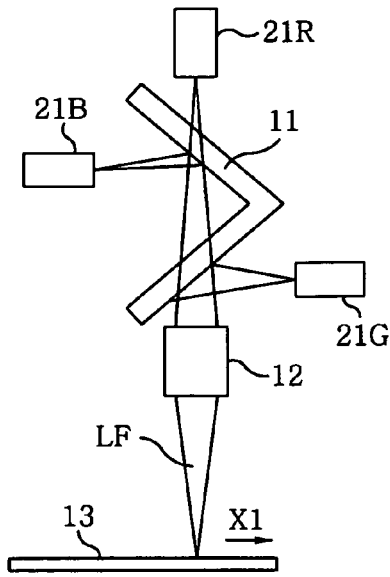
FIGS. 8A to 8C schematically describe a conventional print head.
Figure 8B:
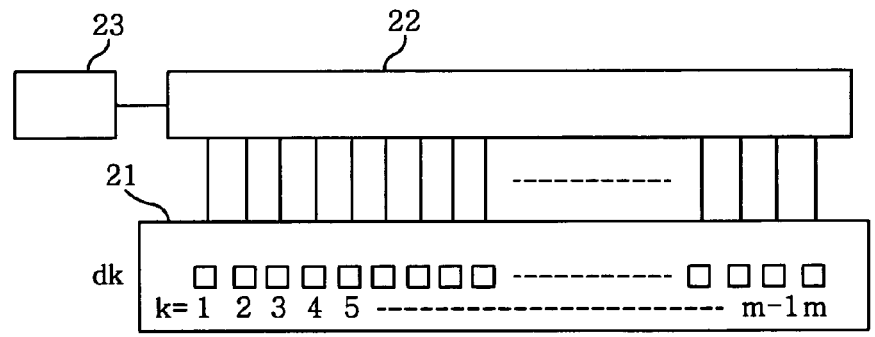
Figure 8C:
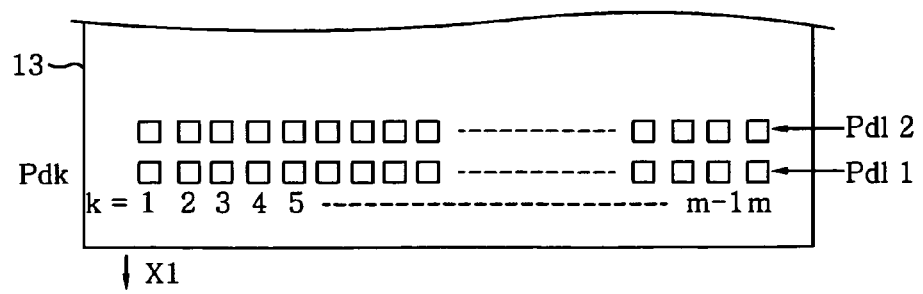
Figure 9A:
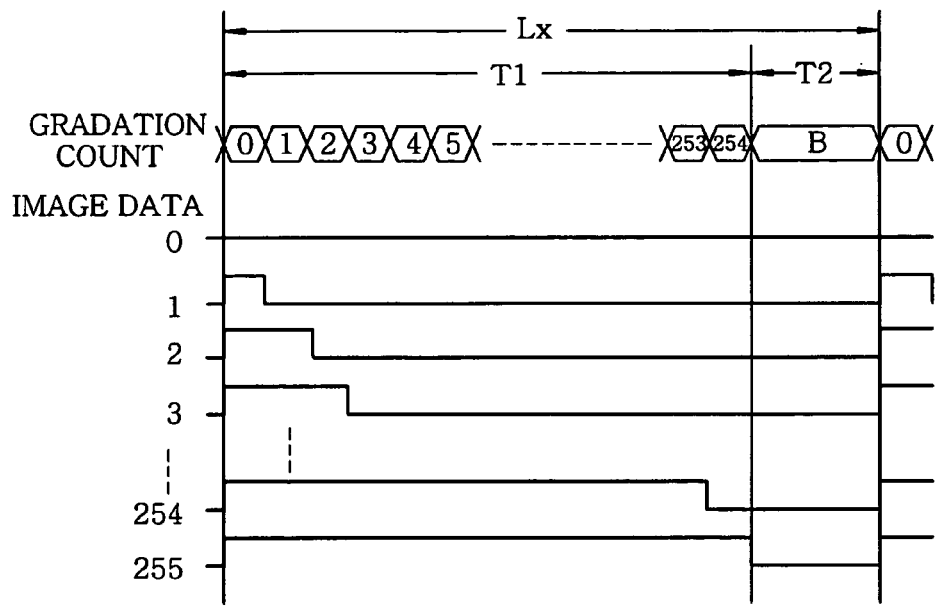
Figure 9B:
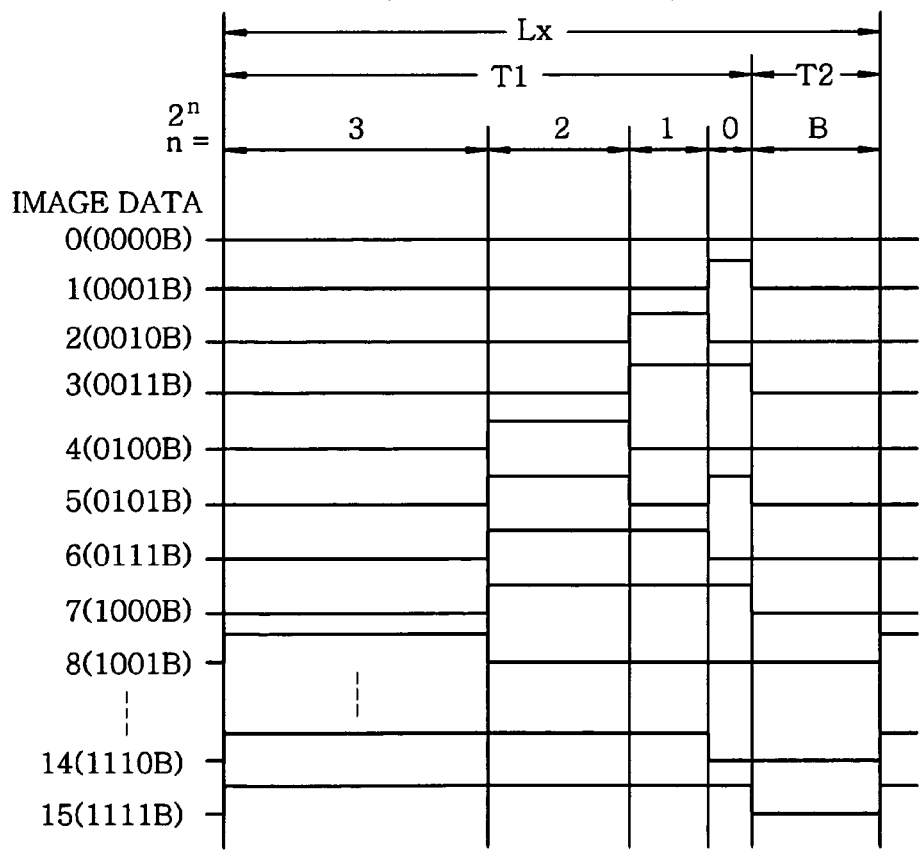
Figure 10A:
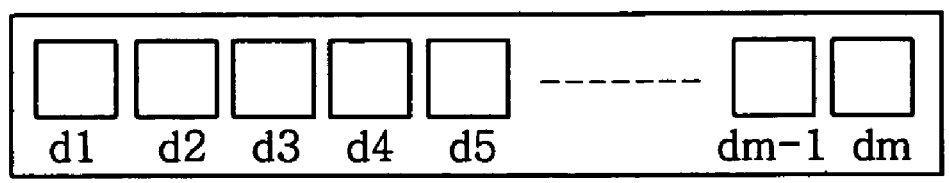
FIGS. 10A and 10B illustrate rows of light emitting elements of two array light sources having resolutions of 300 dpi and 600 dpi, respectively.
Figure 10B:
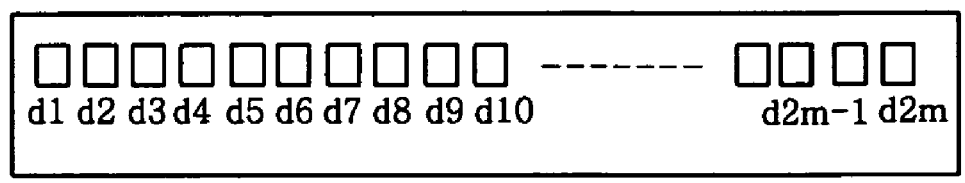
Figure 10C:
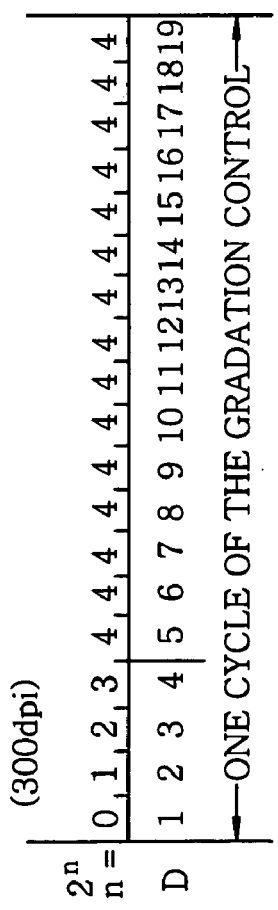
FIGS. 10C and 10D show data transmission times when controlling gradation of the array light sources respectively having the resolutions of 300 dpi 600 dpi in accordance with a conventional gradation control method combining the pulse accumulation method and the pulse weight-application method.
Figure 10D:
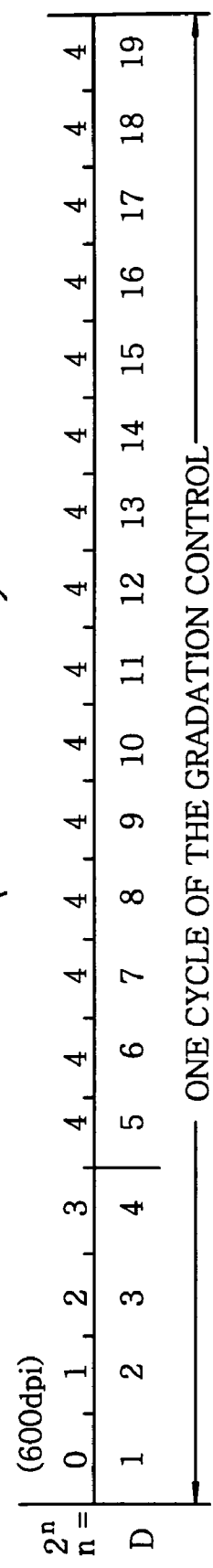

FIGS. 7A to 7D illustrate exemplary applications of the pulse accumulation pulse weight-application method shown in FIG. 6B to print heads using array light sources of 300 dpi and 600 dpi, respectively. FIGS. 7A and 7B are examples based on 32 steps of the gradation and FIGS. 7C and 7D present examples based on 256 steps of the gradation.

In case shown in FIG. 7A, 31 of a weight $2^0$ are transmitted in accordance with the pulse accumulation pulse weight-application method, and none of the other weights are transmitted. In this case, the result is substantially same as that obtained by a pulse accumulation method. However, in case shown in FIG. 7B, each of weights $2^0$, $2^1$ and $2^2$ is transmitted once, and three of weight $2^3$ are transmitted in accordance with the gradation control method employing the simple combination as in the first to the third preferred embodiment. Herein, the number of the weight $2^0$ is preferably set to be an odd number.

Further, in case shown in FIG. 7A, the cycle of the gradation control will be shortened if weights other than $2^0$ such as $2^1$ and $2^2$ are transmitted in addition to $2^0$.

In case shown in FIG. 7C, weights of $2^0$ and $2^4$ are transmitted 15 times for each in accordance with the pulse accumulation pulse weight-application method. Further, in case shown in FIG. 7D, each of weights $2^0$, $2^1$, $2^2$, $2^3$ and $2^4$ is transmitted once in accordance with the gradation control method employing the simple combination as in the first to the third preferred embodiments, and seven of the weight $2^5$ are transmitted. Herein also, the number of the weight $2^0$ is preferably set to be an odd number.

As shown in FIGS. 7C and 7D, weights used for the pulse accumulation pulse weight-application method are $2^0$ and one or more of $2^1$ to $2^a$ (a is a positive integer), and weights used for the gradation control method employing the simple combination of the pulse accumulation method and the pulse weight-application method are one or more of $2^1$ to $2^c$ (c is a positive integer), wherein c is set to be greater than a (for example, c=5 and a=4 in case shown in FIG. 7B).

In the above description of FIGS. 7A to 7D, the pulse accumulation pulse weight-application method is employed for the gradation control of the array light source having the lower resolution of 300 dpi, whereas the simple combination of the pulse accumulation method and the pulse weight-application method is employed for the gradation control of the array light source having the higher resolution of 600 dpi. However, it is also possible to employ the pulse accumulation pulse weight-application method for the gradation control of both the array light sources of 300 dpi and 600 dpi.

For example, weights used for the pulse accumulation pulse weight-application method of the array light source of 300 dpi are $2^0$ and one or more of $2^1$ to $2^a$ (a is a positive integer), and weights of the pulse accumulation pulse weight-application method of the array light source of 600 dpi are $2^0$ and one or more of $2^1$ to $2^b$ (b is a positive integer), wherein b is set to be larger than a (b>a), and the number of the weight $2^0$ of the 600 dpi array light source having the higher resolution is set to be larger than that of the 300 dpi array light source. For example, in case of a gradation control based on 256 steps of the gradation, three of the weight $2^0$ and 63 of the weight $2^2$ (a=2) are set for the 300 dpi array light source and 15 of the weight $2^0$ and 15 of the weight $2^4$ (b=4) are set for the 600 dpi array light source.

The array light sources employed in the first to the fourth preferred embodiment are not limited to those in which light emitting elements are arranged in a single row, and light emitting elements may be arranged such that odd-numbered and even-numbered light emitting elements are alternately arranged in a serrated pattern. Further, light emitting elements of the array light sources in accordance with the present invention may also be arranged in plural rows forming serrated patterns or the like.

While the invention has been shown and described with respect to the preferred embodiments, it will be understood by those skilled in the art that various changes and modifications may be made without departing from the scope of the invention as defined in the following claims.

What is claimed is:

1. A print head driving method for controlling a gradation of a print head employing an array light source of a lower resolution and an away light source of a higher resolution based on image data represented by $2^n$ bits, wherein n is zero or a positive integer, and both of the array light sources are gradation-controlled by a gradation control method employing a simple combination of a pulse weight-application method and a pulse accumulation method, and wherein a combination ratio of the pulse weight-application method applied to the array light source having the higher resolution is set to be larger than that of the away light source having the lower resolution.

2. A print head driving method for controlling a gradation of a print head employing an array light source of a lower resolution and an array light source of a higher resolution based on image data represented by $2^n$ bits, wherein n is 0 or a positive integer, and both of the array light sources are gradation-controlled by a pulse accumulation pulse weight-application method.

3. The method of claim 2, wherein weights used for the pulse accumulation pulse weight-application method applied to the array light source having the lower resolution are $2^0$ and one or more of $2^1$ to $2^a$, and weights used for the pulse accumulation pulse weight-application method applied to the away light source having the higher resolution are $2^0$ and one or more of $2^1$ to $2^b$, wherein a and b are positive integers, b is set to be larger than a, the number of the weight $2^0$ applied to the array light source having the higher resolution is set to be larger than that of the away light source having the lower resolution, and the number of transmissions of the image data of the array light source having the higher resolution is set to be smaller than that of the array light source having the lower resolution.

4. The method of claim 3, wherein the array light source having the higher resolution activates alternately even-numbered light emitting elements and odd numbered light emitting elements once for each bit of the image data.

5. The method of claim 2, wherein the array light source having the higher resolution activates even-numbered light emitting elements and odd-numbered light emitting elements alternately once for each cycle of gradation control.

6. The method of claim 2, wherein the array light source having the higher resolution activates alternately even-numbered light emitting elements and odd numbered light emitting elements once for each bit of the image data.

7. A print head driving method for controlling a gradation of a print head employing an array light source of a lower resolution and an array light source of a higher resolution based on image data represented by $2^n$ bits, wherein n is 0 or a positive integer, and one of the array light source is controlled by a gradation control method employing a pulse accumulation pulse weight-application method whereas the other is controlled by a gradation control method employing a simple combination of a pulse weight-application method and a pulse accumulation method.

8. The method of claim 7, wherein the array light source having the lower resolution is controlled by the gradation control method employing the pulse accumulation pulse weight-application method, weights used therefor being $2^0$ and one or more of $2^1$ to $2^a$, wherein the away light source having the higher resolution is controlled by the gradation control method employing a simple combination of the pulse weight-application method and the pulse accumulation method, weights used therefor being one or more of $2^1$ to $2^c$, and wherein a and c is positive integers, c is set to be larger than a, and the number of transmissions of the image data of the away light source having the higher resolution is set to be smaller than that of the array light source having the lower resolution.

9. The method of claim 8, wherein the array light source having the higher resolution activates alternately even-numbered light emitting elements and odd numbered light emitting elements once for each bit of the image data.

10. The method of claim 7, wherein the array light source having the higher resolution activates even-numbered light emitting elements and odd-numbered light emitting elements alternately once for each cycle of gradation control.

11. The method of claim 7, wherein the array light source having the higher resolution activates alternately even-numbered light emitting elements and odd numbered light emitting elements once for each bit of the image data.

12. A print head driving method for controlling a gradation of a print head employing an array light source of a lower resolution and an array light source of a higher resolution based on image data represented by $2^n$ bits, wherein n is zero or a positive integer, and both of the array light sources are gradation-controlled by a gradation control method employing a simple combination of a pulse weight-application method and a pulse accumulation method, and wherein the array light source having the higher resolution activates even-numbered light emitting elements and odd-numbered light emitting elements alternately once for each cycle of gradation control.

13. A print head driving method for controlling a gradation of a print head employing an array light source of a lower resolution and an array light source of a higher resolution based on image data represented by $2^n$ bits, wherein n is zero or a positive integer, and both of the array light sources are gradation-controlled by a gradation control method employing a simple combination of a pulse weight-application method and a pulse accumulation method, and wherein the array light source having the higher resolution activates alternately even-numbered light emitting elements and odd numbered light emitting elements once for each bit of the image data.

14. The method of claim 13, wherein the order of activating the odd-numbered light emitting elements and the even-numbered light elements is changed for every single cycle of gradation control.

15. An image formation apparatus for controlling a gradation of a print head employing an array light source of a lower resolution and an away light source of a higher resolution based on image data represented by $2^n$ bits, wherein n is 0 or a positive integer, and both of the array light sources are controlled by a gradation control method employing a simple combination of a pulse weight-application method and a pulse accumulation method, and wherein a combination ratio of the pulse weight-application method applied to the array light source having the higher resolution is set to be larger than that of the away light source having the lower resolution.

16. An image formation apparatus for controlling a gradation of a print head employing an array light source of a lower resolution and an away light source of a higher resolution based on image data expressed by $2^n$ bits, wherein n is 0 or a positive integer, and both of the away light sources are controlled by a gradation control method employing a pulse accumulation pulse weight-application method.

17. An image formation apparatus for controlling a gradation of a print head employing an array light source of a lower resolution and an away light source of a higher resolution based on image data represented by $2^n$ bits, wherein n is 0 or a positive integer, and one of the array light sources is controlled by a gradation control method employing a pulse accumulation pulse weight-application method, whereas the other source is controlled by a gradation control method employing a simple combination of a pulse weight-application method and a pulse accumulation method.

18. An image formation apparatus for controlling a gradation of a print head employing an array light source of a lower resolution and an away light source of a higher resolution based on image data represented by $2^n$ bits,
- wherein n is 0 or a positive integer, and both of the away light sources are controlled by a gradation control method employing a simple combination of a pulse weight-application method and a pulse accumulation method, and
- wherein the array light source having the higher resolution activates even-numbered light emitting elements and odd-numbered light emitting elements alternately once for each cycle of gradation control.

19. An image formation apparatus for controlling a gradation of a print head employing an array light source of a lower resolution and an away light source of a higher resolution based on image data represented by $2^n$ bits,
- wherein n is 0 or a positive integer, and both of the away light sources are controlled by a gradation control method employing a simple combination of a pulse weight-application method and a pulse accumulation method, and
- wherein the away light source having the higher resolution activates alternately even-numbered light emitting elements and odd numbered light emitting elements once for each bit of the image data.

* * * * *